United States Patent
Modzel (10) Patent No.: US 10,583,647 B2
(45) Date of Patent: Mar. 10, 2020

(54) METHOD OF CONTROLLING WARPING IN 3D PRINTING

(71) Applicant: Ford Motor Company, Dearborn, MI (US)

(72) Inventor: John Modzel, Farmington Hills, MI (US)

(73) Assignee: FORD MOTOR COMPANY, Dearborn, MI (US)

( * ) Notice: Subject to any disclaimer, the term of this patent is extended or adjusted under 35 U.S.C. 154(b) by 4 days.

(21) Appl. No.: 15/597,645

(22) Filed: May 17, 2017

(65) Prior Publication Data
US 2018/0333924 A1    Nov. 22, 2018

(51) Int. Cl.
| | |
|---|---|
| B29C 64/40 | (2017.01) |
| B33Y 80/00 | (2015.01) |
| B33Y 10/00 | (2015.01) |
| B33Y 50/02 | (2015.01) |
| B29C 64/386 | (2017.01) |

(52) U.S. Cl.
CPC ............ *B33Y 80/00* (2014.12); *B29C 64/386* (2017.08); *B29C 64/40* (2017.08); *B33Y 10/00* (2014.12); *B33Y 50/02* (2014.12)

(58) Field of Classification Search
CPC ................... B33Y 10/00; B29C 64/40
See application file for complete search history.

(56) References Cited

U.S. PATENT DOCUMENTS

| | | | |
|---|---|---|---|
| 5,429,908 A | 7/1995 | Hokuf et al. | |
| 2005/0136220 A1 | 6/2005 | Park et al. | |
| 2014/0048981 A1* | 2/2014 | Crump ................ | B29C 67/0066 |
| | | | 264/401 |
| 2014/0314613 A1 | 10/2014 | Hopkinson et al. | |
| 2016/0136903 A1 | 5/2016 | Herran et al. | |
| 2018/0154574 A1* | 6/2018 | Mark ........................ | B22F 3/24 |

FOREIGN PATENT DOCUMENTS

| | | |
|---|---|---|
| EP | 0338751 B1 | 3/1996 |
| WO | 8910249 A1 | 11/1989 |

* cited by examiner

*Primary Examiner* — Michael M Dollinger
(74) *Attorney, Agent, or Firm* — Vincent Mastrogiacomo; Brooks Kushman P.C.

(57) ABSTRACT

Systems and methods for controlling warping and/or curling in a 3D-printed component are disclosed. One method may include fabricating a component having one or more anchors attached thereto layer-by-layer via additive manufacturing. The component and anchor(s) may be formed of a first material. The method may also include fabricating a support structure to support portions of the component as it is fabricated. The support structure may at least partially enclose the anchor(s). The anchor(s) and the support structure may be removed from the component after it is fabricated. Each anchor may be the same size and shape, which may reduce design time and allow the same anchor design to be used across multiple components. The support structure enclosing the anchors may lock them into place and prevent the component from warping or curling, for example, due to expansion or contraction during cooling.

18 Claims, 6 Drawing Sheets

METHOD OF CONTROLLING WARPING IN 3D PRINTING

TECHNICAL FIELD

The present disclosure relates to methods of controlling warping in 3D printing, for example, by restraining part geometry.

BACKGROUND

Additive manufacturing, also referred to as 3D printing, is a manufacturing process that allows for layer-by-layer fabrication of a component. There are numerous types of additive manufacturing processes, which may use inkjet-style printers, laser curing/sintering, light-based curing, or other techniques. Additive manufacturing can be very cost and time effective for producing one part or a small number of parts, for example, for prototypes or low-volume manufacturing. Although intricate and complicated part geometries can be formed by 3D printing, the nature of the process may present particular challenges. One challenge is expansion or contraction of the printed material as each layer cools.

SUMMARY

In at least one embodiment, a method is provided. The method may include fabricating a component having one or more anchors attached thereto layer-by-layer via additive manufacturing, the component and anchor(s) being formed of a first material; fabricating a support structure to support portions of the component as it is fabricated, the support structure at least partially enclosing the anchor(s); and removing the anchor(s) and the support structure from the component after it is fabricated.

In one embodiment, the support structure is formed of a second material that is different than the first material. The second material may be a dissolving material and the removing step may include dissolving the support structure. In one embodiment, a plurality of anchors are attached to the component. Each of the plurality of anchors may have a same shape and/or size. The plurality of anchors may be spaced around a perimeter of the component. Each of the plurality of anchors spaced around the perimeter may be partially, but not completely, enclosed by the support structure. At least one of the plurality of anchors may be positioned at a corner of the component. In one embodiment, at least one of the one or more anchors is completely enclosed by the support structure. In another embodiment, the anchor may include a base and an attachment portion extending from the base, the attachment portion including an attachment surface where the anchor is attached to the component. The attachment surface may comprise less than 25% of a surface area of the attachment portion.

In at least one embodiment, a non-transitory computer-readable medium is provided having computer-readable instructions stored thereon that are executed by a processor at a computer. The instructions may include to control an additive manufacturing computer system to: fabricate a component having one or more anchors attached thereto layer-by-layer using a first material; and fabricate a support structure to support portions of the component as it is fabricated, the support structure at least partially enclosing the anchor(s).

The additive manufacturing computer system may be controlled to form the support structure of a second material that is different than the first material. The additive manufacturing computer system may be controlled to fabricate a plurality of anchors attached to the component, each anchor having a same size and shape. In one embodiment, the additive manufacturing computer system is controlled to fabricate a plurality of components each having one or more anchors attached thereto, each of the one or more anchors having a same size and shape.

In at least one embodiment, a 3D-printed component is provided. The component may include a component body; a plurality of anchors attached to the component body, the anchor and the component formed of a first material; and a support structure, formed of a second material, attached to the component body and at least partially enclosing each anchor.

In one embodiment, each of the anchors has a same size and shape. In another embodiment, each of the anchors may include a base and an attachment portion extending from the base, the attachment portion including an attachment surface where the anchor is attached to the component. The attachment surface may comprise less than 25% of a surface area of the attachment portion.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Additive manufacturing is also referred to as 3D printing. There are multiple types of additive manufacturing, but the processes all generally include building a three-dimensional (3D) object by dividing the object into "2D" slices and building the object one slice at a time, one on top of another. While these slices or layers are referred to as "2D," each layer has a finite thickness, which may depend on the type of equipment used, the resolution of the equipment, or other factors.

In at least one embodiment, additive manufacturing includes forming a plurality of successive layers each having a uniform thickness. Additive manufacturing can be performed using a range of materials, including polymers and metals. In addition, some additive manufacturing techniques can incorporate more than one material into the final object (e.g., 2 or more materials). The additive manufacturing techniques have been classified into seven categories by the American Society for Testing and Materials (ASTM) group: "ASTM F42—Additive Manufacturing." These seven categories include (1) Vat Photopolymerisation; (2) Material Jetting; (3) Binder Jetting; (4) Material Extrusion; (5) Powder Bed Fusion; (6) Sheet Lamination; and (7) Directed Energy Deposition. Several techniques will be described in greater detail below, however, any technique in the above categories may be incorporated into the disclosed methods.

In one embodiment, the additive manufacturing process may include curing a liquid polymer using a source of electromagnetic radiation, such as light. The light may be visible light, UV light, infrared, or others. The light may be in any suitable form, such as a laser. In vat photopolymerisation, a container (vat) of liquid polymer may be cured one layer at a time using a light source, such as a UV laser. Stereolithography (SLA) is a vat photopolymerisation technique that uses an ultraviolet laser to create the object one layer at a time. To form each layer, the light source (e.g., a laser beam) may trace a two-dimensional shape corresponding to a certain cross-section of the object on the surface of the uncured polymer vat. The light (e.g., UV) may cure a 2D shape traced on the polymer to create a hardened layer having a certain thickness. The first layer may be formed on a substrate, while subsequent layers are cured on top of the previous layer. After each layer is cured, a platform may lower the partially formed object by the depth of a single layer. Uncured polymer may cover the partially formed object such that a new layer can be formed. The process is repeated until a fully formed object is created.

Material jetting is another form of 3D printing. Similar to SLA, material jetting includes curing an uncured polymer using light, such as UV light (e.g., by laser). Material jetting may include depositing small amounts of uncured polymer using an inkjet-printer type nozzle. The nozzle may place the uncured material in a predetermined 2D pattern to form a layer of an object. The light source may then quickly cure the polymer after it is deposited to lock it in place and bond it to the previous layer. In another embodiment, a part may be generated by heating a source material to at least its melting temperature and extruding the material from a nozzle. One example of such a technique is fused deposition modeling (FDM). FDM uses a filament or wire, which may be a polymer or metal, which is fed to an extrusion nozzle. The nozzle is heated to melt the material and deposit it in the shape of a 2D layer. The melted material cools and solidifies as it leaves the nozzle to form each layer of the object.

Another 3D printing process includes fusing a source material powder or melting a source material powder using a heat source (e.g., a laser). One example of powder bed fusion that operates on this principle is selective laser sintering (SLS). SLS generally includes using a laser to sinter or fuse powders into a 2D layer of an object. SLS may be used with plastic and/or metal powders. After the laser scans each 2D layer, the powder bed may be lowered by one layer thickness and a new layer of powder introduced onto the partially formed object and the next layer in sintered. Selective layer melting (SLM) is similar to SLS, except that instead of sintering the material, the material is melted and then cools to solidify in the desired shape.

The additive manufacturing techniques described above may all be implemented using 3D models, for example, created or generated by a computer aided design (CAD) program. The techniques may use a numerically controlled mechanism, which may be controlled by a computer-aided manufacturing (CAM) program. Accordingly, the additive manufacturing processes described above may use a special purpose or specially adapted computer system that is programmed or configured to carry out layer-by-layer additive manufacturing steps. The controller programming may vary depending on the type of additive manufacturing process being used. The additive manufacturing process may include using a programmable robotic arm.

As described above, 3D printing generally includes building up a component layer by layer. Accordingly, each new layer must be supported by the preceding layer. If the new layer is to have a larger or different footprint than the preceding layer, then the new layer will have to overhang the preceding layer in some regions. For relatively small overhangs, this may not be an issue. However, if the overhang will extend outward for many subsequent layers and/or the angle of the overhang is relatively steep, then the effect of gravity may cause the material to sag, droop, or otherwise not maintain the designed shape.

To address this issue, 3D printed components may include a support material or support structure. The support material is printed along with the designed component but is intended to be removed once the printing is finished, thereby leaving the intended shape. The support material may be printed in any suitable manner, for example, as spaced apart columns or an open lattice structure. While a solid support structure may be used, more open structures like columns or a lattice may reduce the amount of material necessary and may allow the support material to be removed more easily. When a support material is necessary may depend on multiple factors, such as the type of 3D printing technique, the material being printed, the design/shape of the component, or others. For some 3D printing techniques, a general rule of thumb may be that an overhang of more than 45 degrees should have a support material. The software associated with the 3D printing machine (or other software) may automatically generate the support structure for a component design. Accordingly, a component may be designed (e.g., using CAD) and input into the printing software, which may then automatically generate the support material structure and control the printing process.

The type of support material and its design may depend on the 3D printing technique and equipment being used. In some embodiments, the support material may be the same material as the designed component. For example, 3D printing processes that use only a single material may require that the support material and the component material are the same. In other embodiments, the support material may be different from the component material. This may be possible when 3D printing equipment is used that allows for multiple materials to be printed for a single printing operation. In these embodiments, the support material may be a lower cost material and/or a recyclable material, since the support material will be removed and discarded once printing is complete. In some embodiments, the support material may be a material that is dissolvable. This may allow the support material to be removed without cutting or breaking it away, and may reduce or eliminate post-processing, such as sanding.

One issue that may occur for 3D printing is warping or curling of layers as they cool and/or solidify. Most materials change their size/volume as they cool or solidify, either getting larger or smaller depending on their coefficient of thermal expansion (CTE). This change in size due to the coefficient of thermal expansion can cause the layers to warp or curl. The problem may be more prevalent for overhanging portions of the component, since there may be no underlying structure to adhere to. Alternatively, the overhanding portion may be supported by a support material, which may be a different material than the component. In these circumstances, the adhesion to the support material may not be as strong as to an underlying layer of the same material. Warping and/or curling may generally increase with the distance from the printing platform (if present). Accordingly, overhanging portions of a component that are higher up on the component (relative to the printing direction) may be at a greater risk of warping or curling.

Figure 1:
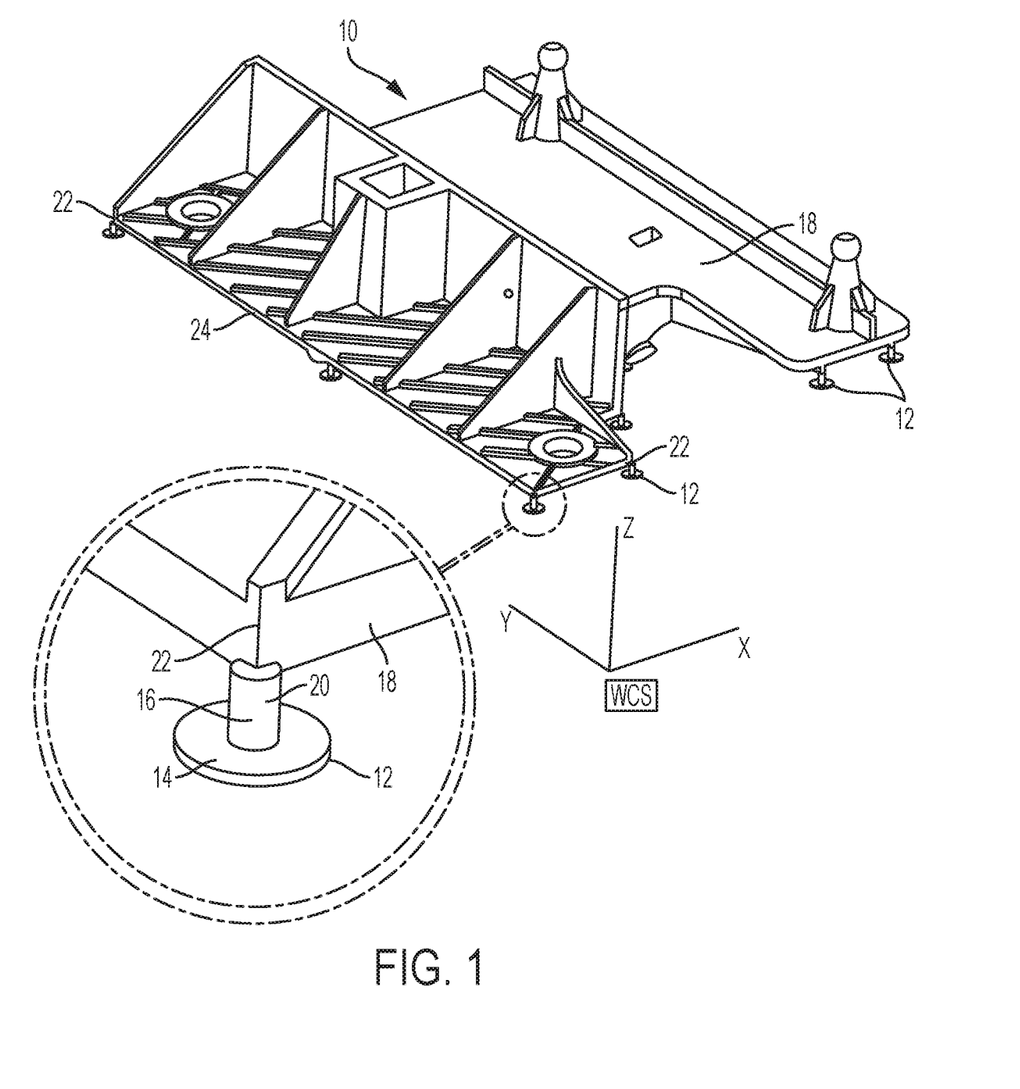
FIG. 1 is a front perspective view of a component to be built using 3D printing, according to an embodiment.
Figure 2:
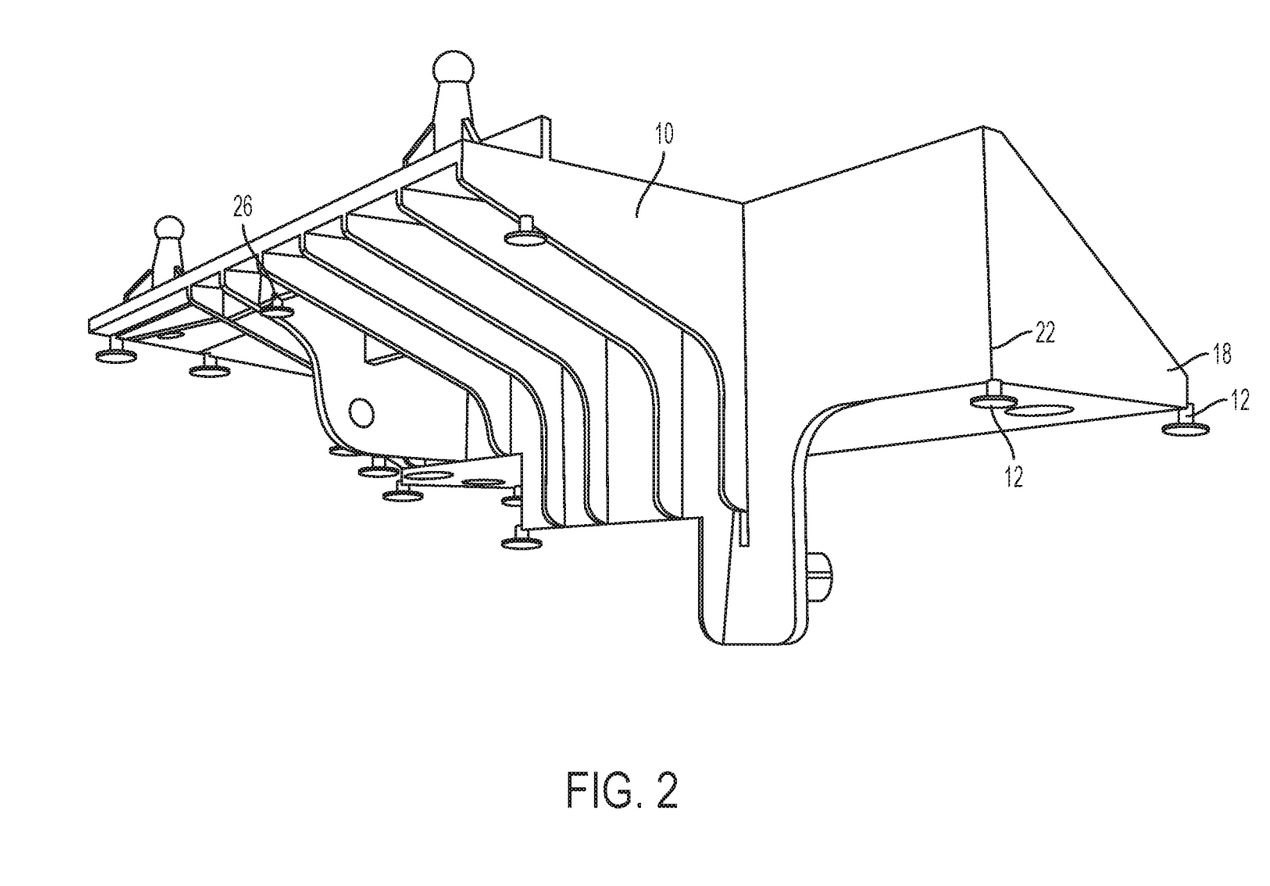
FIG. 2 is a rear perspective view of the component of FIG. 1.
Figure 3:
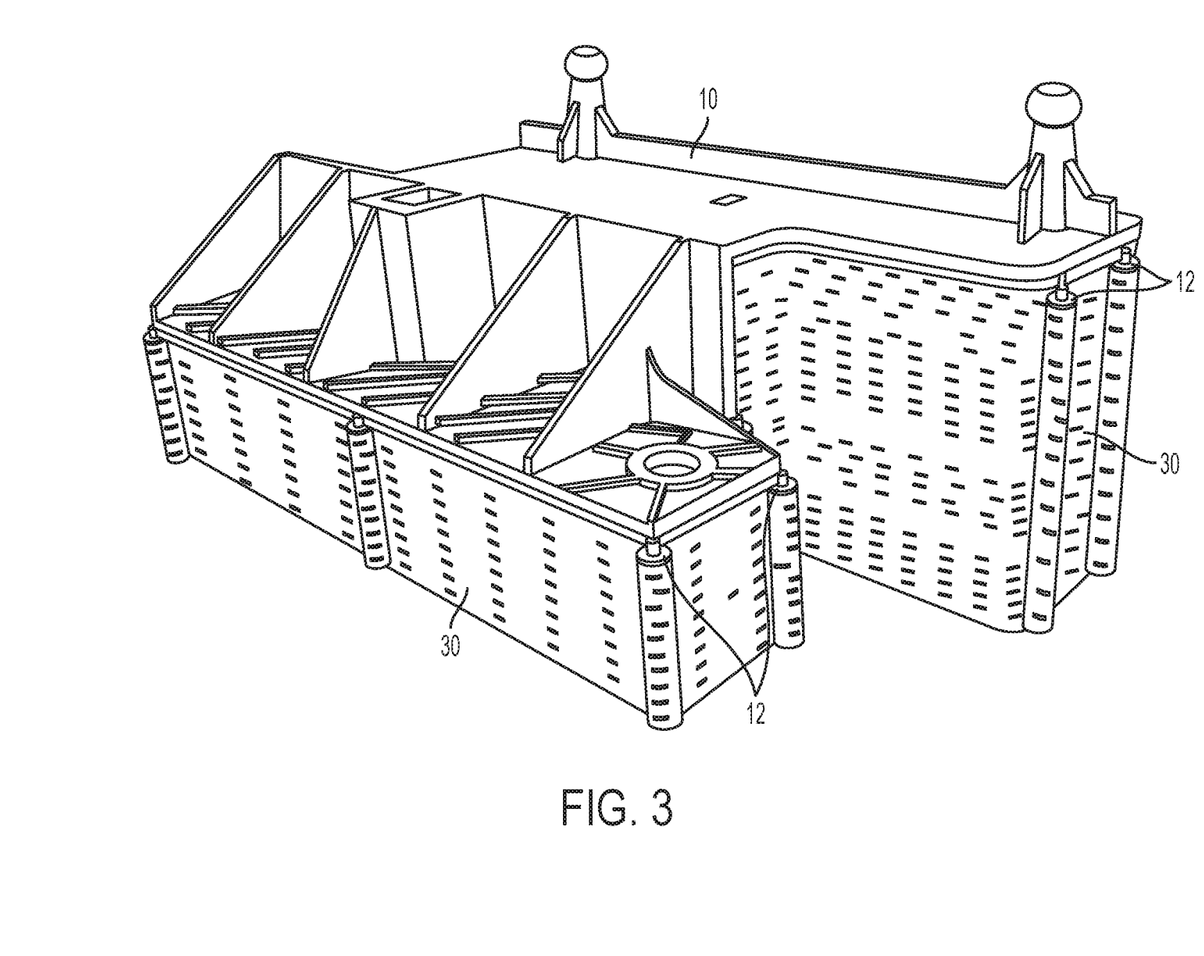
FIG. 3 is a front perspective view of the component of FIG. 1 3D-printed along with a support material, according to an embodiment.
Figure 4:
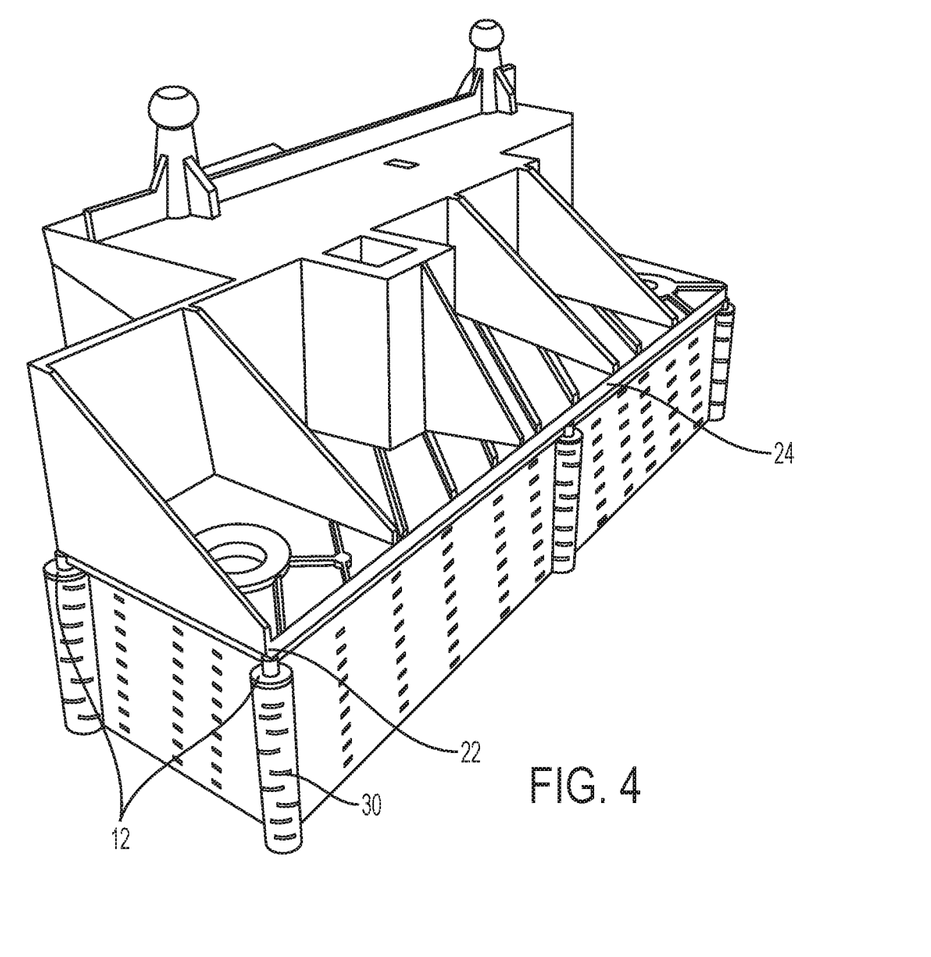
FIG. 4 is another front perspective view of the component of FIG. 1 3D-printed along with a support material, according to an embodiment.
Figure 5:
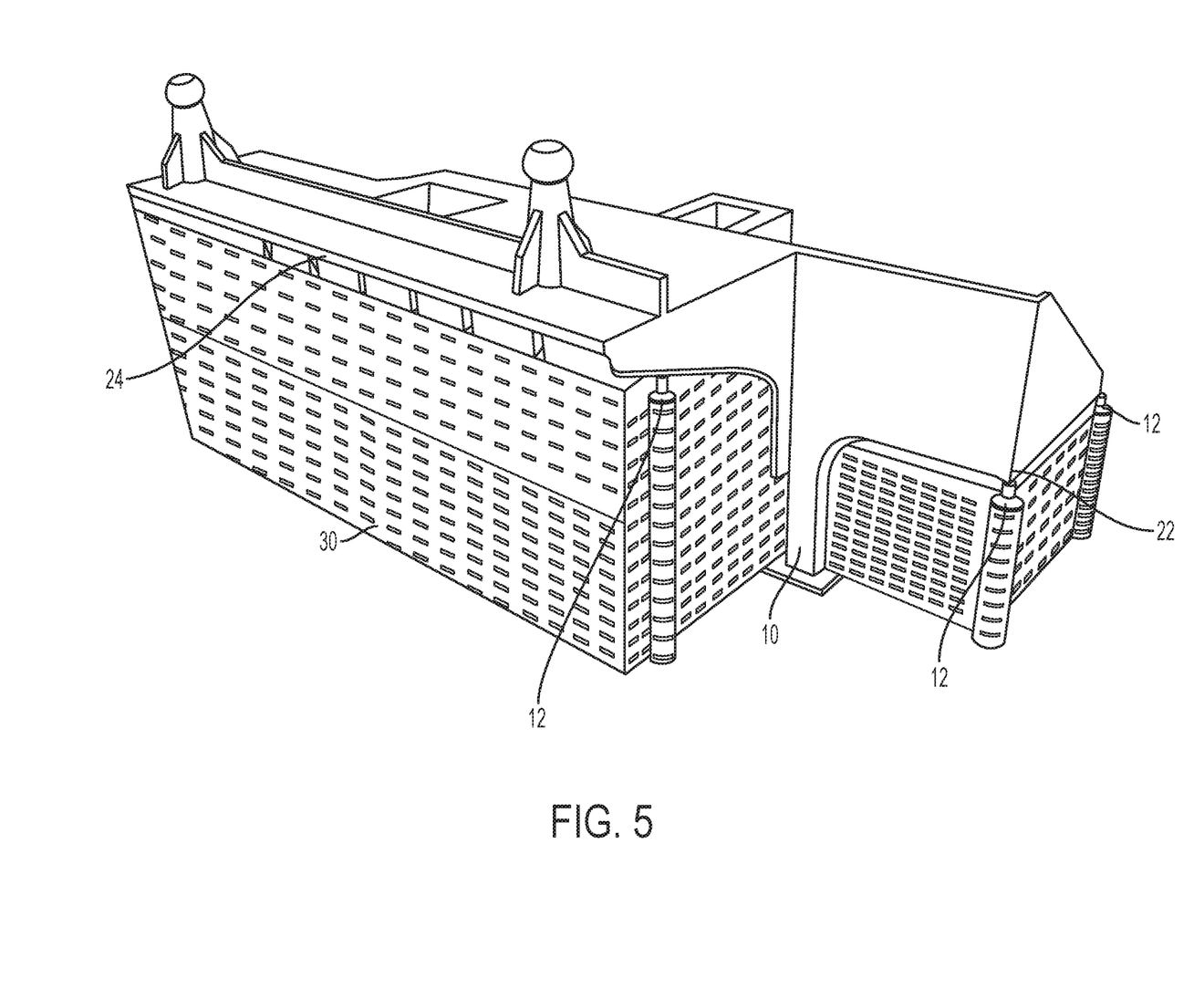
FIG. 5 is a rear perspective view of the component of FIG. 1 3D-printed along with a support material, according to an embodiment.
Figure 6:
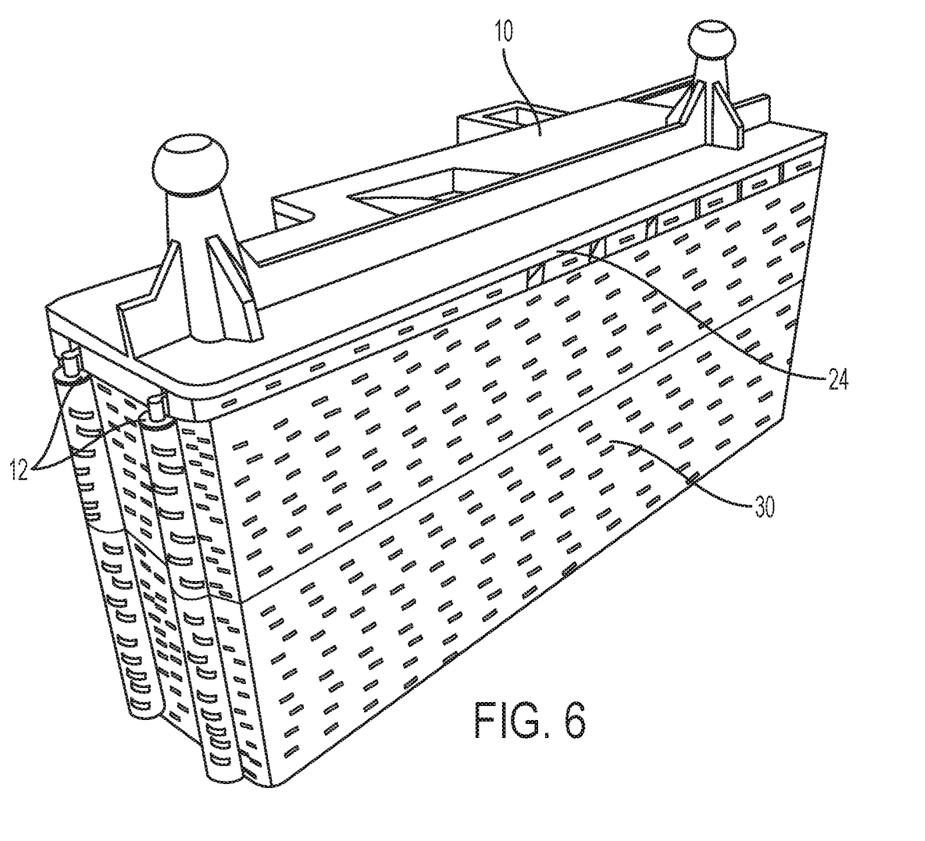
FIG. 6 is another rear perspective view of the component of FIG. 1 3D-printed along with a support material, according to an embodiment.

With reference to FIGS. 1-6, a method of controlling or limiting warping and/or curling in 3D printed components is disclosed. With reference to FIGS. 1 and 2, a component 10 is shown that may be formed by 3D printing (additive manufacturing). The component 10 may be any component that is able to be manufactured by 3D printing. In one embodiment, the component 10 may be a vehicle component or a component for vehicle testing, such as a bracket design for vibration testing (e.g., FIGS. 1-6). The component 10 is shown without a support material. The component 10 may therefore represent a 3D rendering of the component which may be used as the input for a 3D printing process. The support material may be generated based on the design of the component in FIGS. 1 and 2.

It has been discovered that improved control of warping and/or curling may be provided by including anchors 12 in the component 10. The anchors 12 may be positioned in areas or regions of the component that are at high risk for warping or curling. Each anchor 12 may include a base 14 and an attachment portion 16 extending from the base 14. The attachment portion 16 may be in contact with a body 18 of the component, wherein the body 18 represents the portion of the component 10 that is the intended final shape (e.g., after any trimming, sanding, etc.). the attachment portion 16 may be the only portion of the anchor 12 that is in contact with the body 18. For example, the base 14 may not directly contact the body 18.

In at least one embodiment, the attachment portion 16 may have a relatively small area at the point of contact with the body 18. This may allow the anchor 12 to be removed from the body with little force after the printing is complete. The small contact area may also leave little or no blemish in the surface of by body 18 after the anchor 12 is removed, thereby reducing or eliminating post-processing, such as sanding. In one embodiment, the attachment portion 16 may include or be formed as a post or column 20 extending from the base 14. The post 20 may have any suitable shape, such as circular or rectangular in cross-section (e.g., forming a cylinder or rectangular prism). The base 14 may have a larger horizontal cross-section than the post 20. This may provide increased attachment area to the support material (described in more detail below). In one embodiment, the base 14 may be shaped as a plate (e.g., a thin, flat sheet of material). The plate may have any suitable shape, such as a disc (e.g., a short cylinder), a rectangular prism, or any other geometric or irregular shape.

The anchor or anchors 12 may be positioned on portions of the component 10 that are at high risk of warping or curling. Non-limiting examples of such portions may include cantilevered portions, angled or sloped portions, or the corners/edges of the component. Accordingly, one or more anchors 12 may be positioned at one or more of these portions of the component 10 to prevent or mitigate warping or curling during the printing process. Anchors 12 may also be positioned in regions of the component 10 that are not highly susceptible to warping/curling. In one embodiment, the anchors 12 may be spaced about the perimeter of the component 10, for example, around the entire perimeter. The spacing of the anchors 12 may be even, however, it is not required. In another embodiment, an anchor 12 may be disposed in one or more corners 22 of the component 10. The corner may be any location where two sides or edges of the component meet in a plane parallel to the printing platform. The corner(s) may have a relatively sharp angle, for example, less than 135 degrees, less than 120 degrees, or about 90 degrees or less. The corner(s) may be rounded.

Accordingly, the component 10 may include one or more anchors 12 (e.g., a plurality) attached thereto. The anchors 12 may be attached to a bottom or underside of the component 10. In at least one embodiment, two or more of the anchors 12 may have the same shape and/or size. In one embodiment, two or more of the anchors 12 may be substantially identical (e.g., may be mirror images). In one embodiment, all of the anchors 12 may have the same shape/and or size or may be identical. In another embodiment, there may be two or more anchor designs (e.g., size/shape) used for a single component. Different anchor designs (within a single component or across components) may be used based on factors such as the material being used, the particular shape/size of a particular region, the type of support material being used, or others.

The size and shape of the anchor 12 (or multiple anchors) may be stored in memory of the 3D printing system (e.g., a processor, memory, and software with a 3D printing machine/apparatus) and may be accessible by the printing software (e.g., CAD-based software). Accordingly, the same anchor size/shape may be easily added and duplicated within the printing instructions of a component and/or across multiple component designs. For example, the same anchor size and shape may be used in and added to two or more different component designs. The size/shape/design of the anchor may therefore be generic and independent of the remainder of the component design. It therefore may save time and simplify the process of designing a single component and a variety of components.

With reference to FIGS. 3-6, several perspective views are shown of the component 10 printed with a support material 30. As described above, the support material 30 is provided to support portions of the component 10 that are overhanging or cantilevered. In the example shown, the support material has a lattice type structure, however, it may have any suitable type of structure (e.g., columns). In this embodiment, the support material 30 is a different type of material than the component 10. In this embodiment, the component 10 is formed of nylon, while the support material is formed of Stratasys SR30 Soluble Support (a terpolymer of methacrylic acid, styrene, and butylacrylate). However, any suitable 3D-printable materials may be used in accordance with the present disclosure, including other polymers, metals, or ceramic materials. As described above, the component and the support material may be formed of the same material or a different material.

In at least one embodiment, the component 10 may include one or more anchors 12 that are at least partially embedded in the support material 30 when the printing process is completed (prior to removing the support material). The anchor(s) 12 may be partially or completely embedded within or enclosed/encapsulated by the support material 30. The degree to which an anchor is embedded/enclosed/encapsulated may depend on its location on the component 10. As described above, anchors 12 may be disposed at the corners 22 of the component. These anchors may be only partially embedded/enclosed/encapsulated by the support material. For example, for a 90 degree corner, approximately ¼ of the anchor may be embedded/encapsulated. The amount of embedding may correspond to the sharpness of the corner. For example, a 90 degree corner may be ¼ embedded, a 60 degree corner may be ⅙ embedded, and a 120 degree corner may be ⅓ embedded. Similarly, an anchor located on a straight edge 24 may be approximately ½ embedded. Anchors 12 that are disposed in an internal portion of the component 10, such as those not on an outer edge, may be completely embedded/encapsulated by the support material 30. An example of a completely embedded anchor 12 may be the anchor 26 shown in FIG. 2. As shown in the rear perspective views in FIGS. 5 and 6, the anchor 26 is not visible because it is completely embedded in the support material 30.

As shown in FIGS. 3-6, for anchors 12 that are on a perimeter of the component 10, a portion of the anchor may extend beyond the perimeter of the component (e.g., in top plan view). This portion may include a portion of the base 14 and, potentially, a portion of the post 20. The portion of the base 14 that extends beyond the perimeter of the component 10 (e.g., the portion to remain after trimming/removal of the anchors) may therefore have support material 30 thereunder. The support material 30 supporting the base 14 may have a shape that corresponds to the shape of the base 14. For example, in the embodiment shown, the bases 14 have a circular shape in the plane parallel to the platform. Therefore, the support material 30 has a cylindrical shape extending from a bottom of the support material (e.g., the initial platform height) to the bottom of the base 14. If the base 14 is partially embedded in the support material 30, then the support material under the exposed portion of the base may correspond to the shape of the exposed portion. For example, if the base is circular and half exposed, the support material may be a half cylinder, and if the base is ¾ exposed, the support material may be a ¾ cylinder (e.g., on a side and in a corner, respectively).

Accordingly, during printing, the anchor(s) may be at least partially embedded/encapsulated by the support material. This encapsulation may provide resistance to movement such as warping or curling beyond that of adhesion to the support material. Since the anchors are formed of the same material as the component, the anchor may be bonded to the component more strongly than the component would bond to an underlying support material. The support material surrounding the anchor may lock the anchor in place, thereby preventing the connected portion of the component from moving, warping, or curling. Once the component is finished printing, the support material may be removed using standard methods, such as mechanically trimming or chemically dissolving. As described above, the anchors may be connected to the component via an attachment portion having a small contact area with the body of the component. This may allow the anchors to be easily snapped off or trimmed (e.g., manually or via automated equipment). The small contact area may also result in a small area to be sanded or otherwise post-machined. In some embodiments, there may be no sanding or other processing necessary. In one embodiment, the contact area of the attachment portion may be less than 50% of a surface area of the attachment portion, for example, less than 40%, 30%, 25%, 20%, 15%, 10%, or 5%.

The shape and design of the anchor may be saved, for example as a pre-defined object, in the printing/design software or other memory accessible thereto. Therefore, the anchor may be quickly and easily added to the component design and repeated therein. The same anchor may be used across different component designs, thereby simplifying the design process. The printing/design software may treat the anchor as if it is part of the component, forming it from the same material. The software may also generate support material or support structure for the anchors, as it would for the rest of the component. This may again make the addition of the anchors simple and not add additional time or complexity to the design process.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method, comprising:
   fabricating a component having a plurality of anchors attached thereto layer-by-layer via additive manufacturing, the component and the plurality of anchor(s) being formed of a first material, the plurality of anchors having a same shape;
   fabricating a support structure to support portions of the component as it is fabricated, the support structure at least partially embedding the plurality of anchor(s); and
   removing the plurality of anchor(s) and the support structure from the component after it is fabricated.

2. The method of claim 1, wherein the support structure is formed of a second material that is different than the first material.

3. The method of claim 2, where in the second material is a dissolving material and the removing step includes dissolving the support structure.

4. The method of claim 1, wherein each of the plurality of anchors has a same size.

5. The method of claim 1, wherein the plurality of anchors is spaced around a perimeter of the component.

6. The method of claim 5, wherein each of the plurality of anchors spaced around the perimeter are partially, but not completely, embedded by the support structure.

7. The method of claim 5, wherein at least one of the plurality of anchors is positioned at a corner of the component.

8. The method of claim 1, wherein at least one of the one or more anchors is completely embedded by the support structure.

9. The method of claim 1, wherein the anchor includes a base and an attachment portion extending from the base, the attachment portion including an attachment surface where the anchor is attached to the component.

10. The method of claim 9, wherein the attachment surface comprises less than 25% of a surface area of the attachment portion.

11. A method, comprising:
    fabricating a component via additive manufacturing and having first and second anchors attached thereto at first and second locations of the component, the first and second anchors having the same shape;
    embedding first and second anchors by first and second degrees via a support structure supporting portions of the component as it is fabricated based on the first and second locations; and removing the first and second anchors and the support structure supporting portions from the component after the fabricating and embedding steps.

12. The method of claim 11, wherein the first location is a corner of the component and the second location is a straight edge of the component.

13. The method of claim 12, wherein the first degree is less than the second degree.

14. The method of claim 12, wherein the second anchor is completely embedded in the support structure.

15. The method of claim 11, wherein the first and second locations are corners of the component having first and second sharpnesses, and the first and second degrees are based on the first and second sharpnesses.

16. A method, comprising:
fabricating a component via additive manufacturing and having first and second anchors attached thereto at first and second locations of the component, the first and second anchors having the same shape;
during the fabricating step, embedding first and second anchors by first and second degrees via a support structure supporting portions of the component as it is fabricated based on the first and second locations; and
removing the first and second anchors and the support structure supporting portions from the component after the fabricating step.

17. The method of claim 16, wherein the first location is a corner of the component and the second location is a straight edge of the component.

18. The method of claim 17, wherein the first degree is less than the second degree.

\* \* \* \* \*